United States Patent
Naseer-Ul-Islam et al.

(10) Patent No.: US 12,069,522 B2
(45) Date of Patent: Aug. 20, 2024

(54) METHODS FOR HANDLING LOAD VARIATIONS IN HANDOVER SCENARIOS

(71) Applicant: NOKIA TECHNOLOGIES OY, Espoo (FI)

(72) Inventors: Muhammad Naseer-Ul-Islam, Munich (DE); Ingo Viering, Munich (DE); Ahmad Awada, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 309 days.

(21) Appl. No.: 17/600,362

(22) PCT Filed: Apr. 5, 2019

(86) PCT No.: PCT/EP2019/058587
§ 371 (c)(1),
(2) Date: Sep. 30, 2021

(87) PCT Pub. No.: WO2020/200469
PCT Pub. Date: Oct. 8, 2020

(65) Prior Publication Data
US 2022/0264389 A1    Aug. 18, 2022

(51) Int. Cl.
*H04W 36/00*    (2009.01)
(52) U.S. Cl.
CPC ................ *H04W 36/0072* (2013.01)
(58) Field of Classification Search
CPC ................................. H04W 36/0072
See application file for complete search history.

(56) References Cited

U.S. PATENT DOCUMENTS

2003/0207688 A1* 11/2003 Nikkelen .......... H04W 36/0066
                                                           455/438
2008/0014941 A1* 1/2008 Catovic ................. H04W 36/30
                                                           455/436
(Continued)

FOREIGN PATENT DOCUMENTS

WO    WO 2018/156696 A1    8/2018
WO    WO 2019/029674 A1    2/2019

OTHER PUBLICATIONS

International Search Report and Written Opinion dated Jan. 29, 2020 corresponding to International Patent Application No. PCT/EP2019/058587.
(Continued)

*Primary Examiner* — Duc C Ho
(74) *Attorney, Agent, or Firm* — Lippes Mathias LLP

(57) ABSTRACT

Aspects of the present invention pertain to a method, comprising receiving a preparatory handover request pertaining to at least one or more physical resources, respectively associated to a particular communication service, preliminarily deciding on the feasibility of such preparatory handover request for each of said at least one or more physical resources associated to the particular communication service dependent on at least one feasibility criterion, and validating the preliminary decision on the feasibility of the preparatory handover request dependent on at least one validation criterion. Likewise, corresponding apparatus and computer program products are addressed, both from network entity perspective such as a gNB, as well as from a terminal's perspective, e.g. from a UE perspective.

21 Claims, 7 Drawing Sheets

(56) References Cited

U.S. PATENT DOCUMENTS

| | | |
|---|---|---|
| 2014/0254554 A1 | 9/2014 | Liu et al. |
| 2019/0306761 A1 | 10/2019 | Jin et al. |
| 2021/0410039 A1* | 12/2021 | Da Silva ........... H04W 36/0079 |

OTHER PUBLICATIONS

3GPP TS 38.423 V15.2.0 (Dec. 2018), Technical Specification, 3rd Generation Partnership Project; Technical Specification Group Radio Access Network; NG-RAN; Xn application protocol (XnAP) (Release 15), Jan. 10, 2019, XP 051591642, pp. 1-281.

3GPP TS 36.331 V15.4.0 (Dec. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 15), Dec. 2018.

3GPP TS 38.300 V15.4.0 (Dec. 2018), Technical Specification, 3rd Generation Partnership Project; Technical Specification Group Radio Access Network; NR; NR and NG-RAN Overall Description; Stage 2 (Release 15), Dec. 2018.

3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15), Dec. 2018.

H. Martikainen, I. Viering, A. Lobinger, T. Jokela, "On the Basics of Conditional Handover for 5G Mobility," IEEE International Symposium on Personal, Indoor and Mobile Radio Communications (PIMRC) 2018 , Bologna, Italy, Sep. 2018.

MulteFire Alliance Technical Specification Group Radio Access Network; Evolved Universal Terrestrial Radio Access (E-UTRA); Radio Resource Control (RRC); Protocol specification (Release 1.1); MFA TS 36.331 v1.1.1 (Feb. 2018).

MulteFire Alliance Technical Specification Group Radio Access Network; Evolved Universal Terrestrial Radio Access Network (E-UTRAN); X2 application protocol (X2AP) (Release 1.1); MFA TS 36.423, v1.1.1 (Feb. 2018).

* cited by examiner

Fig. 4 (For Case I):

METHODS FOR HANDLING LOAD VARIATIONS IN HANDOVER SCENARIOS

TECHNICAL FIELD

The present invention relates to methods for handling load variations in handover scenarios. In particular, it relates to such methods for handling load variations in so-called conditional handover scenarios.

LIST OF ABBREVIATIONS/ACRONYMS

3GPP 3$^{rd}$ Generation Partnership Project
CBRA Contention-Based Random Access
CFRA Contention Free Random Access
CHO Conditional Handover
eMBB enhanced Mobile Broadband
eNB evolved NodeB
HO Handover
IoT Internet of Things
gNB next generation NodeB
IE Information Element
M Mandatory
MTC Machine Type Communication
NG Next Generation
NGAP Next generation application protocol
NS Network Slice
O Optional
PDU Packet Data Unit/Protocol Data Unit
PRB Physical Resource Block
QOS Quality of Service
RAN Radio Access Network
RACH Random Access Channel
RRC Radio Resource Control
RRM Radio Resource Management
S-NSSAI Single Network Slice Selection Assistance Information
SD Slice Differentiator
SST Slice Service Type
UE User Equipment
URLLC Ultra-Reliable Low Latency Communication
Xn Interface between gNB-to-gNB, as defined in 3GPP TS38.423

BACKGROUND

In case a mobile terminal such as a user equipment UE is assigned within a (cellular) communication network to one serving node (or "cell"), which is currently serving and/or associated to the terminal, a handover HO will be performed to another node (or "cell"), which will subsequently serve the terminal in case of a handover condition. A typical handover condition occurs if a terminal is moving within the cellular network across the geographical coverage of a respective node. However, the same geographical coverage can be served by plural nodes or cells, and also in such scenarios, handover conditions may occur. For example, a (single), node may define different cells (e.g. distinguishable by different physical resources associated thereto) and a handover may thus occur at the same node but pertain to a handover from cell to cell. Various handover scenarios are known, and among those, one handover scenario is a conditional handover CHO.
Conditional HO (CHO):

The CHO scenario is similar to a legacy handover. A message sequence chart for a (typical and known) CHO scenario is shown in FIG. 1.

Entities involved in signalling are illustrated in horizontal arrangement as a terminal or user equipment UE, a source gNB (currently serving/associated to the UE) and a target gNB (subsequently serving/associated to the UE), to which a handover or conditional handover CHO is (to be) performed. Source and target gNB communicate via an interface Xn (not illustrated as such). Messages exchanged between such entities are illustrated as arrows there between, and actions/processing of messages at an entity are illustrated as boxes/circles. The time sequence of the messages is from "top-to-down" in the diagram.

The first steps (denoted by S1 to S8 in "Phase 1") are largely identical to the legacy handover. The source gNB performs measurement control (S1) of the terminal UE. A configured event (S2) triggers the UE to send a measurement report (S3) to the serving gNB. Based on this report, the source gNB typically prepares the target gNB for the handover (Handover Request (in S4 from the source gNB to the target gNB) and receives (in S5 from the target gNB) a Handover Request Acknowledgement) and then sends a handover command to the UE (S6). This command includes a list of the cells or, in general, resources prepared for the handover. The target gNB in a step S7 prepares a corresponding reservation of the resources (cells) acknowledged in S5, and the terminal UE, in a step S8, acknowledges the HO command to the source gNB.

For the legacy HO, the UE will immediately access the target cell/target gNB to complete the handover. Instead, for CHO, the UE will only access the target gNB once an additional CHO execution condition expires. The condition is typically configured, e.g. by the source during HO Command in S6, or can be accomplished in S1 with the measurement control message.

The advantage of the CHO is that the HO command (in S6) can be sent very early, in the so-called preparatory phase (phase 1), when the UE is still safe in the source cell, without risking the access in and the stability of the target cell.

The "actual" HO is performed in the CHO execution phase (phase 2, see steps S9 to S13). After the CHO execution condition is met, i.e. the CHO execution event occurs, see S9, the terminal UE in a step S10 performs synchronization and random access with/towards the target gNB. Thereafter, a handover complete message is sent in S11 from the UE to the target gNB, and the target gNB acknowledges this in a step S12 in a handover complete acknowledgment message to the source gNB. In a subsequent step/stage S13, the UE and source gNB will adapt to the extent that the "old" i.e. previous preparations or settings are not valid anymore for them. Insofar, after the (HO or) CHO is completed, the target gNB will become the new source gNB.

More details on the CHO can be found in H. Martikainen, I. Viering, A. Lobinger, T. Jokela, "On the Basics of Conditional Handover for 5G Mobility," IEEE International Symposium on Personal, Indoor and Mobile Radio Communications (PIMRC) 2018, Bologna, Italy, September, 2018.

Furthermore, the Multefire Alliance has already specified a version of CHO called "autonomous handover with dedicated resources", as described in MulteFire Alliance Technical Specification Group Radio Access Network; Evolved Universal Terrestrial Radio Access (E-UTRA); Radio Resource Control (RRC); Protocol specification (Release 1.1); MFA TS36.331 v1.1.1 (2018-02), and in MulteFire Alliance Technical Specification Group Radio Access Network; Evolved Universal Terrestrial Radio Access Network (E-UTRAN); X2 application protocol (X2AP) (Release 1.1); MFA TS36.423, v1.1.1 (2018-02).

Network Slicing:

Network slicing is an important 5G feature to support different services using the same underlying mobile network infrastructure, see for details 3GPP TS 38.300. Network slices can differ either in their service requirements like Ultra-Reliable Low Latency Communication (URLLC) and enhanced Mobile Broadband (eMBB) or differ in the tenant that provides those services. Other distinction criteria e.g. QoS criteria or combinations of those may apply.

Generally, a network slice may be considered as being defined to encompass one or more physical resources, which are respectively associated to a particular communication service.

A network slice is typically identified via the S-NSSAI (Single-Network Slice Selection Assistance Information). Current 3GPP specifications allow a UE to be simultaneously connected and served by at most eight S-NSSAIs. On the other hand, there is no limit on the number of network slices that each cell may support. That is, the cell may support tens or even hundreds of S-NSSAIs.

FIG. 2 shows a format of the S-NSSAI. The S-NSSAI may include both Slice Service Type (SST) and Slice Differentiator (SD) field with a total length of 32 bits, or include only the SST field part, in which case the length of S-NSSAI is 8 bits only. The SST field may have standardized and non-standardized values. Values 0 to 127 belong to the standardized SST range. For instance, SST value of 1 may indicate that the slice is suitable for handling of 5G eMBB, 2 for handling of URLLC, etc. The slice differentiator SD is operator-defined only.

Network Slicing and Handover:

Handover procedure in 5G has been enhanced with network slice information, as described e.g. in 3GPP TS 38.423. In a HO request, the source cell provides a list of PDU sessions to be handed over to the target cell as well as the S-NSSAI to which those PDU sessions belong. Based on the supported features and RRM policies, the target cell can then decide to either accept or reject the requested PDU sessions.

The protocol data unit (and/or referred to as packet data unit) sessions, i.e. PDUs sessions, listed do insofar represent the at least one or more physical resources associated to a particular communication service, i.e. slice, identified by the S-NSSAI. Protocol data units PDUs and sessions defined by those are linked/associated to physical resource blocks PRBs within the available radio spectrum. Stated in other words, a PDU session represents the logical connection between a UE and the data network via the 3GPP system and it is used to identify the different connections the UE has, and to apply the proper QoS attributes to each of those logical connections. (Some example details are given below in Section 9.2.1.1 PDU Session Resources To Be Setup List). So, each UE can have multiple active PDU sessions i.e. have multiple logical connections. Each PDU session can belong to a particular network slice identified by the S-NSSAI and associated QoS profile (for example, how much latency, throughput, priority be given to that PDU session). PRBs are the actual spectrum and time resources the gNBs can use to schedule the UE and its PDU sessions. With network slicing, the gNBs can have a fix quota (% of PRBs) for different slices.

Namely, from an RRM perspective, network slices can also be provided with dedicated resources including the radio resources. For example, a certain percentage of spectrum or PRBs are reserved for one particular slice (Slice A). In such scenario, it is possible that the target cell does not have any free resources for Slice A, even though overall it still has some free radio resources available. The target cell can reject an incoming PDU session HO request corresponding to a network slice for two reasons:

1. Network Slice not supported: This would be the case when the target cell does not support a particular slice.
2. Resources not available for the slice: this would be the case when the target cell does support the slice but, currently, it does not have enough resources for that slice.

CHO is still a proposal for 3GPP Release-16 mobility enhancement and therefore no details are yet standardized. The normal HO procedure in Release-15 has been enhanced with network slice information by including the Single Network Slice Selection Assistance Information (S-NSSAI) as part of the PDU session details in the HO Request and HO Request Acknowledgement messages on Xn interface between two gNBs or other NG-RAN nodes, see 3GPP TS 38.423, as given below.

However, the target cell decides to either accept or reject the requested PDU session only during the HO preparation phase, and for an accepted PDU session, resources need to be reserved for long time period. Such HO decisions can not be altered afterwards. The only possibility would be that the source cell sends another HO request and then the target cell can update its decision based on the currently prevailing (up-to-date) load situation. But in this case, the source cell is not aware of the target cell load situation and it would not be practical to send frequent HO requests for the same UE between the first CHO preparation and actual HO execution.

The following tables show different elements of HO Request and HO Request Ack messages on the Xn interface (see 3GPP TS 38.423) highlighting (by underlining) the network slice related additions and cause of PDU session request rejection. Although this describes the legacy HO behaviour, it is yet likely that CHO specification will take this as baseline and add additional CHO specific information elements. Note that the section numbering is the same as the one used in 3GPP TS 38.423 for easier reference. A detailed explanation of the fields contained in those tables is considered dispensable, as the table is rather self-explanatory.

9.1.1.1 Handover Request

This message is sent by the source NG-RAN node to the target NG-RAN node to request the preparation of resources for a handover.

Direction: source NG-RAN node→target NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | Reject |
| Source NG-RAN node UE | M | | NG-RAN node UE XnAP ID | Allocated at the source NG-RAN node | YES | Reject |

-continued

| IE/Group Name | Presence | Range | IE type and reference | Semantics description | Criticality | Assigned Criticality |
|---|---|---|---|---|---|---|
| XnAP ID reference | | | 9.2.3.16 | | | |
| Cause | M | | 9.2.3.2 | | YES | Reject |
| Target Cell Global ID | M | | 9.2.3.25 | Includes either an E-UTRA CGI or an NR CGI | YES | Reject |
| GUAMI | M | | 9.2.3.24 | | YES | Reject |
| UE Context Information | M | 1 | | | YES | Reject |
| >NG-C UE associated Signalling reference | M | | AMF UE NGAP ID 9.2.3.26 | Allocated at the AMF on the source NG-C connection. | — | |
| >Signalling TNL association address at source NG-C side instance. | M | | CP Transport Layer Information 9.2.3.31 | This IE indicates the AMF's IP address of the SCTP association used at the source NG-C interface | — | |
| >UE Security Capabilities | M | | 9.2.3.49 | | | |
| >AS Security Information | M | | 9.2.3.50 | | — | |
| >Index to RAT/ Frequency Selection Priority | O | | 9.2.3.23 | | — | |
| >UE Aggregate Maximum Bit Rate | M | | 9.2.3.17 | | — | |
| >PDU Session Resources To Be Setup List | | 1 | 9.2.1.1 | Similar to NG-C signalling, containing UL tunnel information per PDU Session Resource; and in addition, the source side QoS flow ⇔ DRB mapping | — | |
| >RRC Context | M | | OCTET STRING | Either includes the HandoverPreparationinformation message as defined in subclause 10.2.2. of TS 36.331 [14], if the target NG-RAN node is an ng-eNB, or the HandoverPreparationinformation message as defined in subclause 11.2.2 of TS 38.331 [10], if the target NG-RAN node is a gNB. | — | |

| IE/Group Name | Presence | Range | IE type and reference | Semantics description | Criticality | Assigned Criticality |
|---|---|---|---|---|---|---|
| >Location Reporting Information | O | | 9.2.3.47 | Includes the necessary parameters for location reporting. | — | |
| >Mobility Restriction List | O | | 9.2.3.53 | | — | |
| Trace Activation | O | | 9.2.3.55 | | YES | Ignore |
| Masked IMEISV | O | | 9.2.3.32 | | YES | Ignore |
| UE History Information | M | | 9.2.3.64 | | YES | ignore |
| UE Context Reference at the S-NG-RAN node | O | | | | YES | Ignore |
| >Global NG-RAN Node ID | M | | 9.2.2.3 | | — | |
| >S-NG-RAN node UE XnAP ID | M | | NG-RAN node UE XnAP ID 9.2.3.16 | | — | |

9.1.1.2 Handover Request Acknowledge

This message is sent by the target NG-RAN node to inform the source NG-RAN node about the prepared resources at the target.

Direction: target NG-RAN node→source NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | Reject |
| Source NG-RAN node UE XnAP ID | M | | NG-RAN node UE XnAP ID 9.2.3.16 | Allocated at the source NG-RAN node | YES | Ignore |
| Target NG-RAN node UE XnAP ID | M | | NG-RAN node UE XnAP ID 9.2.3.16 | Allocated at the target NG-RAN node | YES | Ignore |
| PDU Session Resources Admitted List | M | | 9.2.1.2 | | YES | Ignore |
| PDU Session Resources Not Admitted List | O | | 9.2.1.3 | | YES | Ignore |
| Target NG-RAN node To Source NG-RAN node Transparent Container | M | | OCTET STRING | Either includes the Handover Command message as defined in subclause 10.2.2 of TS 36.331 [14], if the target NG-RAN node is an ng-eNB, or the Handover Command message as defined in subclause | YES | Ignore |

-continued

| IE/Group Name | Presence | Range | IE type and reference | Semantics description | Criticality | Assigned Criticality |
|---|---|---|---|---|---|---|
| | | | | 11.2.2 of TS 38.331 [10], if the target NG-RAN node is ag NB. | | |
| UE Context Kept Indicator | O | | 9.2.3.68 | | YES | Ignore |
| Criticality Diagnostics | O | | 9.2.3.3 | | YES | Ignore |

9.2.1.1 PDU Session Resources To Be Setup List 15

This IE contains PDU session resource related information used at UE context transfer between NG-RAN nodes.

| IE/Group Name | Presence | Range | IE type and reference | Semantics description | Criticality | Assigned Criticality |
|---|---|---|---|---|---|---|
| PDU Session Resources To Be Setup List | | 1 | | | — | |
| >PDU Session Resources To Be Setup Item | | 1..≤maxnoof PDU sessions≥ | | | — | |
| >>PDU Session ID | M | | 9.2.3.18 | | — | |
| >>S-NSSAI | M | | 9.2.3.21 | | — | |
| >>PDU Session Resource Aggregate Maximum Bitrate | M | | 9.2.3.69 | This IE shall be present when at least one non-GBR QoS Flows are been setup. | — | |
| >>UL NG-U UP TNL Information at UPF | M | | UP Transport Layer Information 9.2.3.30 | UPF endpoint of the NG-U transport bearer. For delivery of UL PDUs | — | |
| >>Security Indication | O | | 9.2.3.52 | | — | |
| >>PDU Session Type | M | | 9.2.3.19 | | — | |
| >>QoS Flows To Be Setup List | | 1 | | | — | |
| >>>QoS Flows To Be Setup Item | | 1..<maxnoof QoSFlows> | | | — | |
| >>>>QoS Flow Indicator | M | | 9.2.3.10 | | — | |
| >>>>DL data Forwarding | O | | 9.2.3.34 | | — | |
| >>>>QoS Flow Level QoS Parameters | M | | 9.2.3.5 | | — | |
| >>>>E-RABID | O | | INTEGER (0.15,...) | | — | |
| >>Source DRB to QoS Flow | O | | DRB to QoS Flow Mapping | | — | |

-continued

| IE/Group Name | Presence | Range | IE type and reference | Semantics description | Criticality | Assigned Criticality |
|---|---|---|---|---|---|---|
| Mapping List | | | List 9.2.1.15 | | | |

9.2.1.3 PDU Session Resources Not Admitted List

This IE contains a list of PDU session resources which were not admitted to be added or modified.

| IE/Group Name | Presence | Range | IE type and reference | Semantics description | Criticality | Assigned Criticality |
|---|---|---|---|---|---|---|
| PDU Session Resources Not Admitted List | | 1 | | — | | |
| >PDU Session Resources Not Admitted Item | | 1..<maxnoof PDU Sessions> | | | — | |
| >>PDU Session ID | M | | 9.2.3.18 | | — | |
| >>Cause | O | | 9.2.3.2 | | — | |

9.2.3.2 Cause

The purpose of the Cause IE is to indicate the reason for a particular event for the NGAP protocol.

| IE/Group Name | Presence | Range | IE Type and Reference |
|---|---|---|---|
| CHOICE Cause Group | M | | |
| >Radio Network Layer | | | |
| >>Radio Network Layer Cause | M | | ENUMERATED (Cell not Available, Handover Desirable for Radio Reasons, Handover Target not Allowed, Invalid AMF Region ID, No Radio Resources Available in Target Cell, Partial Handover, Reduce Load in Serving Cell, Resource Optimisation Handover, Time Critical Handover, $TXn_{RELOCoverall}$ Expiry, $TXn_{RELOCprep}$ Expiry, Unknown GUAMI ID, Unknown Local NG-RAN node UE XnAP ID, Inconsistent Remote NG-RAN node UE XnAP ID, Encryption And/Or Integrity Protection Algorithms Not Supported, Protection Algorithms Not Supported, Multiple PDU Session ID Instances, Unknown PDU Session ID, Unknown QoS Flow ID, Multiple QoS Flow ID Instances, Switch Off Ongoing, Not supported 5QI value, $TXn_{DCoverall}$ Expiry, $TXn_{DCprep}$ Expiry, Action Desirable for Radio Reasons, Reduce Load, Resource Optimisation, Time Critical action, |

| IE/Group Name | Presence | Range | IE Type and Reference |
|---|---|---|---|
| | | | Target not Allowed, No Radio Resources Available, Invalid QoS combination, Encryption Algorithms Not Supported, Procedure cancelled, RRM purpose, Improve User Bit Rate, User Inactivity, Radio Connection With UE Lost, Failure in the Radio Interface Procedure, Bearer Option not Supported, UP integrity protection not possible, UP confidentiality protection not possible, Resources not available for the slice, UE Maximum integrity protected data rate reason, Unspecified, . . .) |

In current HO procedures, the target cell provides a HO command in the HO acknowledgement message to the source cell. (See e.g. S5 in FIG. 1.) This HO Command contains the RRC configuration that the UE will use for HO execution while connecting to the target cell. The HO command and therefore the included RRC configuration is configured according to the target cell's acceptance or rejection decision of the PDU session at the time of HO preparation.

In CHO, as there could be a significant time-delay between HO preparation and the actual HO execution (several seconds as shown in the document by Martikainen et al), the situation at the target cell can potentially change during this time. Especially, if the target cell rejects a HO request (some or all PDU sessions or slices) due to overload, it will not include those rejected PDU sessions in the HO command. Ultimately, when the UE performs the actual HO execution by connecting to the target cell, it will not attempt to continue the session for the rejected PDUs. This would still hold even if the target cell has got some free resources later on, at the time of HO execution, for those PDU sessions (slices) previously rejected Similarly, if the target cell accepts some PDU sessions because it has the resources at the time of HO preparation, it must keep those resources reserved for a long time to make sure that it can also successfully perform the HO execution. Otherwise, the resources might not be available when the UE actually performs the HO execution. Such a strict resource reservation might also not be optimal because of the potential large time difference between HO preparation (Phase 1) and execution (Phase 2) as well as the possibility of multiple target cell preparation in case of CHO.

For legacy HO, this is not a problem as there is negligible delay between HO preparation and HO execution. But for CHO, rejecting the PDU sessions (slices) due to no resource availability at the HO preparation phase is not optimal and would result in some PDU sessions to be dropped at the HO execution even though the target cell has got some free resources at the time of HO execution. Also, reserving resources for the accepted PDU sessions for a long time (and for many target candidates) would also not be efficient.

SUMMARY

It is an object of the present invention to improve the prior art.

Methods and devices as defined in the respective independent claims achieve this object.

In particular, according to at least some aspects, there is provided a method, comprising: receiving a preparatory handover request pertaining to at least one or more physical resources, respectively associated to a particular communication service, preliminarily deciding on the feasibility of such preparatory handover request for each of said at least one or more physical resources associated to the particular communication service dependent on at least one feasibility criterion, and validating the preliminary decision on the feasibility of the preparatory handover request dependent on at least one validation criterion, and an apparatus, comprising: a first circuitry, configured to receive a preparatory handover request pertaining to at least one or more physical resources, respectively associated to a particular communication service, and a second circuitry, configured to preliminarily decide on the feasibility of such preparatory handover request for each of said at least one or more physical resources associated to the particular communication service dependent on at least one feasibility criterion, and to validate the preliminary decision on the feasibility of the preparatory handover request dependent on at least one validation criterion.

Advantageous further developments are as set out in respective dependent claims.

Further according to at least some other aspects, there is provided a method, comprising: receiving at least one set of a handover configuration to be applied, detecting a handover execution condition, and responsive thereto, triggering validating the set of handover configuration, and an apparatus, comprising: third circuitry configured to receive at least one set of a handover configuration to be applied, fourth circuitry configured to detect a handover execution condition, and responsive thereto, trigger validating the set of handover configuration.

Advantageous further developments are as set out in respective dependent claims.

Further, computer program products, comprising computer executable code, which, when executed by a processor, perform the method according to any of the method aspects are provided.

According to some example embodiments of the invention, at least one of the following advantages are achieved:
- drawbacks mentioned above in relation to CHO scenarios can be avoided,
- a changing load situation at the HO target cell can be taken account of and insofar the target cell may adapt its behavior in HO depending on the changing load situation,
- HO decisions at the target cell can be efficiently updated after they have initially been taken,
- the target cell(s) involved in CHO are allowed to react better to prevailing load variations,
- even if the load at target cell(s) might change because of the potential large time delay between CHO preparation and execution, the target cell does not have to reject incoming PDU session requests if it does not have enough resources at the time of HO preparation,
- also, the target cell does not have to reserve resources for long time if it accepts the PDU session request,
- the target cell can update or revise its decision about PDU session accept/reject between the HO preparation and execution,
- ultimately, this supports or improves the user quality of experience and service continuity during CHO due to not rejecting PDU session HO requests, when the target cell does not have enough resources during HO preparation, but when it expects to have enough free resources at the time of HO execution,
- it can be avoided that some PDU sessions have to be dropped at the HO execution.

Further advantages become apparent from the following detailed description.

BRIEF DESCRIPTION OF THE DRAWINGS

Further details, features, objects, and advantages are apparent from the following detailed description of the at least some example embodiments of at least some aspects of the present invention, which is to be taken in conjunction with the appended drawings, wherein.

DETAILED DESCRIPTION OF CERTAIN EXAMPLE EMBODIMENTS

Figure 1:
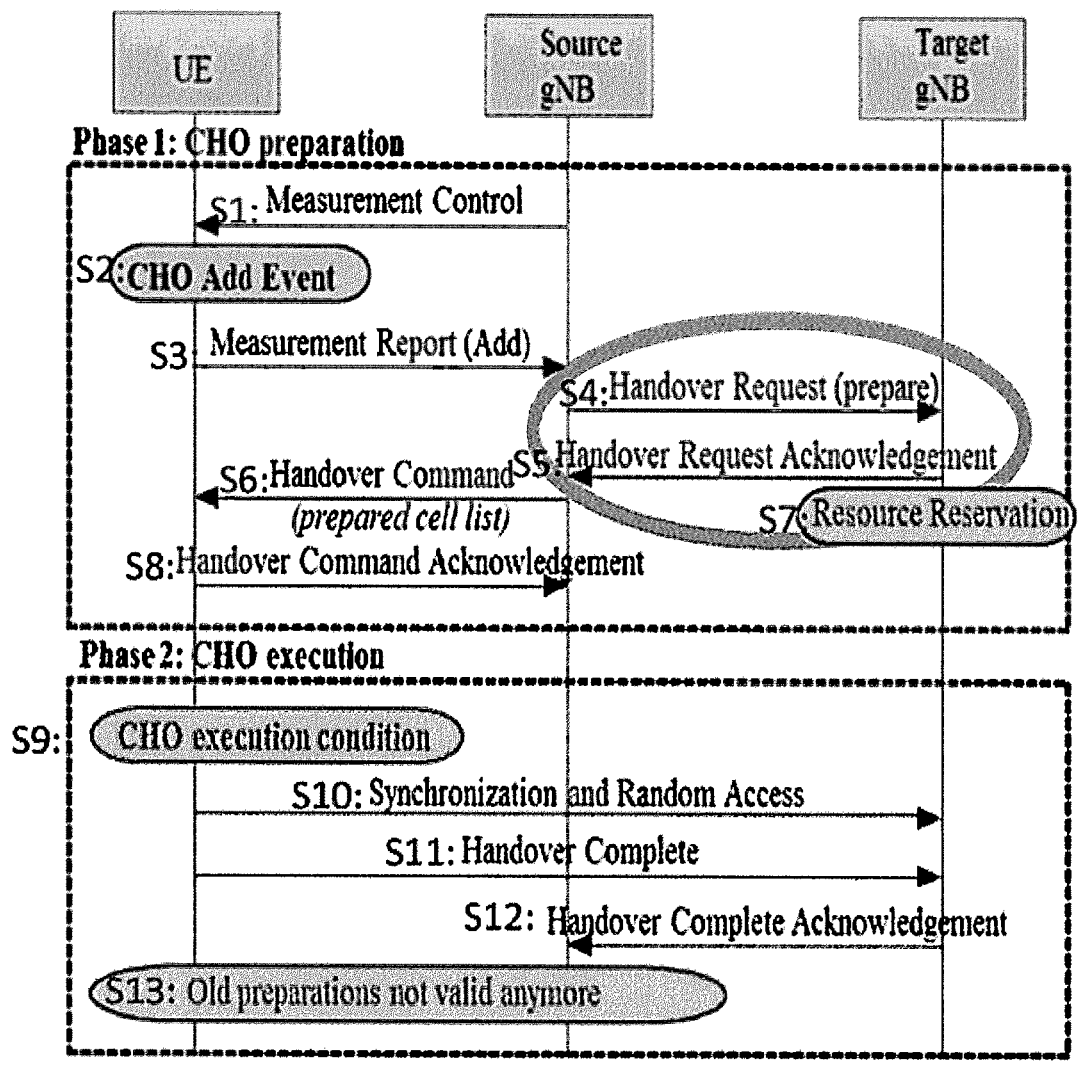
FIG. 1 shows a signaling chart of a conventional conditional handover scenario.
Figure 2:
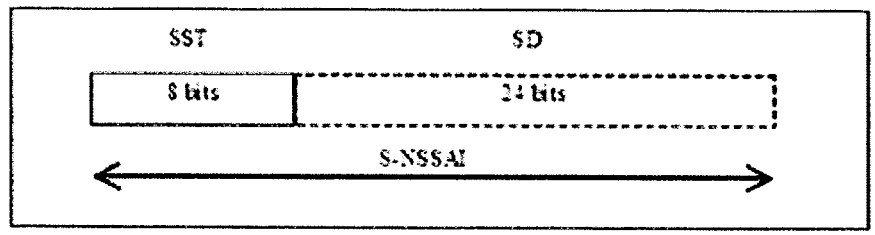
FIG. 2 shows a format of a S-NSSAI information field.

Herein below, certain aspects of the invention are exemplified by at least some embodiments of the invention which are described in detail with reference to the accompanying drawings. Features of the example embodiments can be freely combined with each other unless otherwise described. However, it is to be expressly understood that the description of certain example embodiments/aspects is given by way of example only, and that it is not intended to be understood as limiting the invention to the details disclosed.

It is to be understood that any of the modifications mentioned can be applied singly or in combination to the respective aspects to which they refer, unless they are explicitly stated as excluding alternatives.

Moreover, it is to be understood that the apparatus is configured to perform the corresponding method, although in some cases only the apparatus or only the method are described.

In brief, according to at least an aspect (first aspect) of the invention, it is proposed that for CHO preparation, in addition to accept and reject decisions of PDU session, the target cell can also indicate a CONDITIONAL ACCEPT decision for some or all requested PDU sessions in the HO request. The target cell also configures the HO command in a way that the UE would try to establish the sessions for those conditionally accepted PDU session when connecting to the target cell during HO execution. The target cell can then finally decide during the HO execution whether to accept or reject those conditionally accepted PDU sessions.

According to at least another aspect (modification of first aspect), such a conditional acceptance can in addition also be limited in its validity based on a specific parameter, e.g. for a predetermined time. The "timer" limits the resource reservation at the target gNB such that the target gNB, if needed, can free the reserved resources at the expiry of the timer. Or, in the other case, the target gNB only reserves the resources after the timer expires.

Additionally and/or alternatively, a conditional acceptance/rejection may be based on other examples of such specific parameter, e.g. one other example could be "minimum radio signal strength/quality". This is measured by the UE, so in this case the minimum value can help the UE to better decide the HO execution but the target gNB is not aware of the radio measurements at the UE, so with this metric it will not be possible for the target gNB to free the reserved resources unless the UE informs it about the current radio measurements in an appropriate signaling/reporting message.

Further, according to at least another (second) aspect, instead of a conditional accept decision, whether limited in time (or in view of other additional or alternative parameter (s)) or not, a preliminary rejection decision can be taken. Such preliminary rejection can be revised (reverted or updated) in case a load decision prevailing at the target cell changes. Likewise, such preliminary rejection and/or a reverted preliminary rejection can be valid for a predetermined period of time only (or depend on other additional or alternative parameter(s)).

Further, according to at least another (third) aspect, any decision on rejection of a requested slice or PDU session in a handover can be checked in terms of being revised (reverted), wherein checking is performed selectively dependent on the origin of the request, i.e. the terminal UE Subsequently, aspects of the invention will be described in more detail herein below with reference to the drawings. The proposed invention can be implemented in various of the following ways.

The expression "preparatory handover request" as used in the context of this application document designates an "initial" or a "first" handover request, within scenarios to which aspects of the invention apply. Insofar it is the one HO request sent from source gNB to target gNB, which in particular in conditional HO (CHO) scenarios prepares the CHO prior to the CHO execution.

Figure 3:
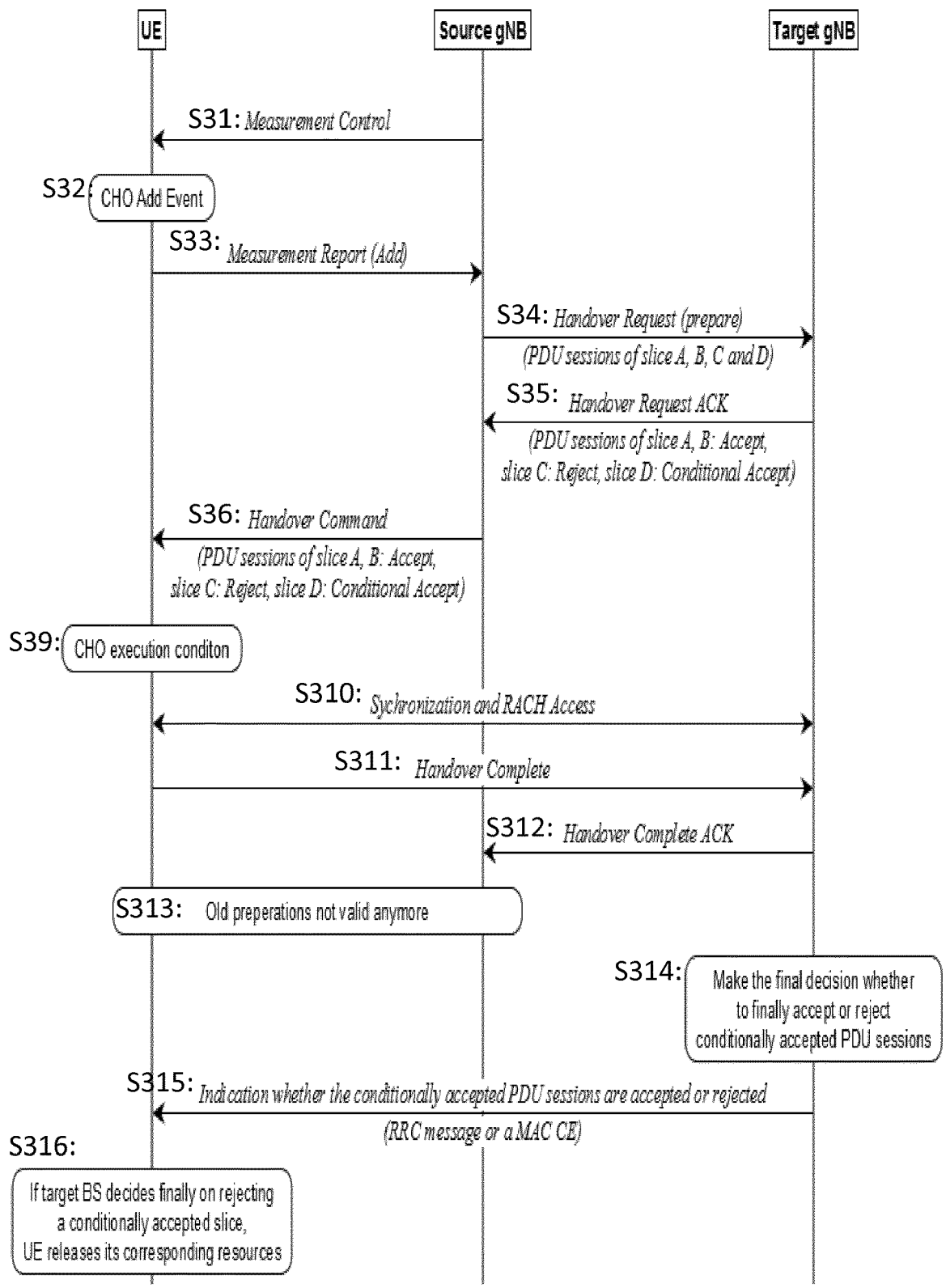
FIG. 3 shows a signaling chart of a conditional handover scenario according to a first aspect of the invention.

FIG. 3 shows a signaling chart of a conditional handover scenario according to a first aspect of the invention. Such solution, in this example, is referred to as a "Conditional Accept Indication from Target gNB". Namely, instead of making a final accept or reject decision, the target cell indicates (in S35) a CONDITIONAL ACCEPT for some or all PDU sessions. The target cell also prepares (with S35) the HO command (of S36) in a way that indicates this conditional acceptance and allows the UE to try to continue the conditionally accepted PDU sessions during the HO execution. During actual HO execution phase the target cell can make the final decision (in S314) whether to finally accept or reject these conditionally accepted PDU sessions and may inform the UE (in S315). The indication to the UE can be an RRC message or a Medium Access Control (MAC) Control Element (CE). If the target cell decides to reject the conditionally accepted PDU session, the UE releases (in step/stage S316) the resources associated with the rejected PDU session and/or slice.

Target cell can indicate a conditional accept, for example, if:

It currently does not have enough resources for the PDU session during HO preparation (but estimates a realistic chance to have enough resources later on).

It has enough resources during HO preparation, but it does not want to strictly reserve them or based on its analysis expect some resource shortage afterwards.

An example is shown in FIG. 3 for a UE having four PDU sessions corresponding to e.g., slice A, B, C and D. Herein, the target gNB supports slices A, B, D but not slice C which is in turn rejected. Among the supported slices A, B and D, the target gNB decides on accepting slices A, B and "conditionally accepting" slice D due to example reasons explained herein above. After the UE completes the random access (S310-S313), the target gNB decides (S314) on whether to finally accept or reject slice D.

In detail, as shown in FIG. 3, processing steps or stages S31, S32, S33, S34 and S35 are largely identical to those explained in relation to FIG. 1 and steps S1 to S6. (Note that steps S7 and S8 of FIG. 1 do not have a direct correspondence in the signaling diagram of FIG. 3.)

At least one difference is that in S35, the target gNB indicates a "conditional" acceptance/rejection for at least one or more of requested physical resources (e.g. slices). This information of a conditional acceptance/rejection is to be inserted in respective information elements of the messages exchanged between the entities. E.g. in a HO request (cf. above), S34, the source gNB would request HO normally, and the target gNB adds e.g. a parameter such as "PDU session resources to be conditionally setup" (conditionally accepted or rejected), in a step S35, i.e. in a HO request acknowledgement message to be sent to the source gNB and from there in a HO command S36 to the UE. Such parameter is then defined within the context of aspects of the invention. Likewise, in an HO acknowledgement message (cf above), this conditional admission/non-admission will be defined, and the "PDU session resources to be setup list" (cf. above) will have to reflect unconditionally and conditionally accepted (or conditionally rejected) PDU resources. Also, the cause for conditionally accepting/rejection such resources or slices can be optionally indicated in a message (cf. above, PDU session resources not admitted list, information element "cause").

Processing steps S39, S310, S311, S312, S313 are largely identical to those explained in relation to FIG. 1 and steps S9, S10, S11, S12, S13, so that a repeated description is omitted here.

A further difference occurs again in step/stage S314 in which the target gNB makes the final decision whether or not to finally accept or reject the (previously) conditionally accepted/rejected resources (slices). Thereafter, in a stage S315, the target gNB sends an indication (in an RRC message or MAC CE) whether the conditionally accepted slice (PDU sessions) are accepted or rejected to the terminal UE. The UE in turn releases those resources related to finally rejected slices (PDU sessions).

The above exemplifies already in detail that according to at least an aspect of the invention, there is provided method, at the target gNB, which comprises receiving a preparatory handover request pertaining to at least one or more physical resources respectively associated to a particular communication service, preliminarily deciding (ie conditional acceptance/rejection) on the feasibility of such preparatory handover request for each of said at least one or more physical resources associated to the particular communication service dependent on at least one feasibility criterion, and validating (final decision) the preliminary decision on the feasibility of the preparatory handover request dependent on at least one validation criterion.

The at least one feasibility criterion and the at least one validation criterion is based on the predicted or current availability of the physical resources associated to the particular communication service.

Also, it comprises receiving, subsequent to the preparatory handover request, a handover-execution request, triggered by a handover execution condition, and responsive thereto, validating the preliminary decision by deciding based on the current availability of the physical resources.

Figure 4:
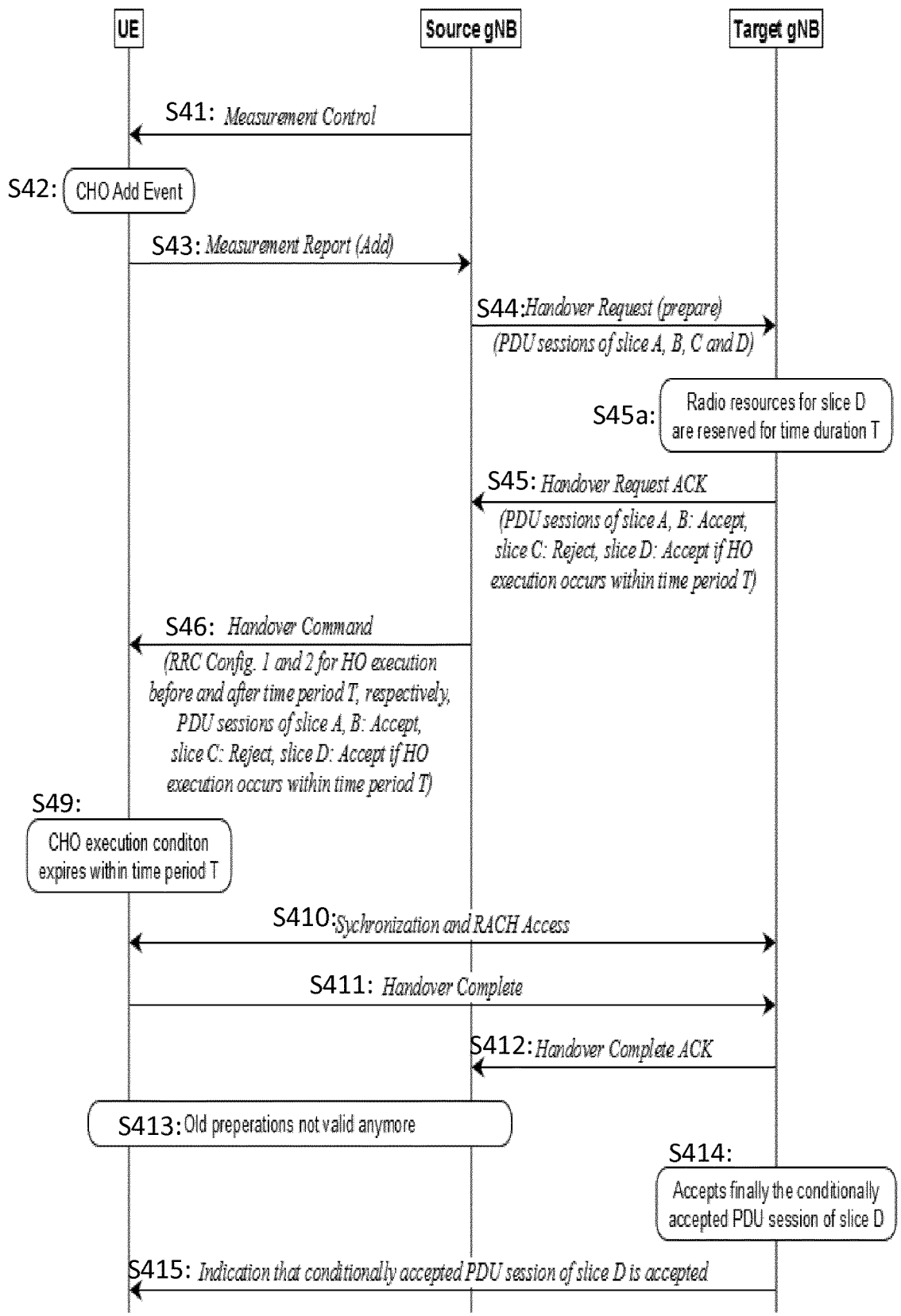
FIG. 4 shows a signaling chart of a conditional handover scenario according to a modification of a first aspect of the invention.

FIG. 4 shows a signaling chart of a conditional handover scenario according to a modification of the first aspect of the invention. As shown, the modification of the first aspect resides in this example modification in a time limited conditional acceptance/rejection. As in relation to FIG. 3, same or similar signalling/processing are denoted by the similar reference signs, which differ in the first digit which represents the number of the figure in which it occurs. (That is, step/stage S1 in FIG. 1 resembles Step S31 in FIG. 3 and Step S41 in FIG. 4 (as well as herein below S51 and S61 in FIGS. 5 and 6, respectively); this systematic of labelling applies also for other steps/stages throughout the signalling diagrams).

The presented variation of the above solution according to the first aspect resides in that the target cell gNB indicates a conditional accept as a preliminary decision, but this preliminary decision has a time restriction in that the at least one validation criterion is a specified time period elapsed since the preliminary decision was taken.

For example, the target cell gNB can indicate an accept (S45) if the UE performs HO execution before a certain time "T". That is, the CHO execution condition in S49 occurs before the expiry of the time "T". This inherently means "reject" (or possibly accepted based on another verification by the target after access), if the UE performs HO execution (S49) after this certain time period. This corresponds to the case when the target cell wants to reserve the resources strictly only for a specified time period "T" (denoted by "For Case l" in FIG. 4).

Alternatively, CONDITIONAL ACCEPT with timer restriction may also mean that access will be accepted only after a certain time T and will be rejected before time T (or possibly accepted based on another verification by the target after access). This corresponds to the case when the target cell assumes that that there will be free resources after time duration T (denoted as Case II, not represented in FIG. 4)

The target cell may also prepare two RRC re-configurations to be provided to the UE. One for the case that the UE performs HO execution before the expiry of time period "T" and the other one for the case that the UE performs HO execution after the expiry of the time period "T". The two RRC reconfigurations corresponding to HO execution before and after time period T, respectively, can be part of the same HO command or two different HO commands, see stage S46.

In such scenario, the UE has to monitor the timer in addition to the HO Execution Condition and based on the timer value, the UE decides to implement the relevant HO Command. (In contrast, in a legacy CHO scenario, the UE only checks for the execution condition and has only one HO Command to implement.)

At HO execution, i.e. the occurrence of the CHO condition, the UE checks the timer and selects the RRC re-configuration accordingly. An example of the modified first aspect is shown in FIG. 4 for Case I, when the UE performs the access (CHO execution condition occurs) to target cell before time period T.

As shown in FIG. 4, steps/stages S41, S42, S43, S44 resemble those in FIG. 1 or 3. In step S45a, the target gNB reserves resources for slice D in this example only for a predetermined time period T and starts a corresponding timer means. In step S45, similar to S5 or S35 the gNB informs the source gNB. The difference is that the conditional acceptance carries the additional time attribute of its temporal validity, i.e. the information that the validation criterion is a specified time period elapsed since the preliminary decision (of conditional acceptance). Step S46 is similar to step S36, with the difference that two different RRC configurations may be prepared for the configurations to be applied for the cases in which the CHO condition is met before or after the expiry of the timer. S49 is similar to S39, as well as steps S410, S411, S412, S413. It is to be noted that while the drawings do not show this in too great detail, actually the HO Command is prepared by the target gNB and is sent to the source gNB in HO Request Ack message, and the source gNB then just forwards the HO Command to the UE.

In step S414, the target gNB accepts finally the conditionally accepted PDU session of slice D in this example, based on the validation criterion of whether the CHO execution condition was met before or after expiry of the timer triggered by the handover request. Of course, the timer can be set differently for different slices/PDU sessions e.g. dependent on the required QoS for a slice, differently for different UEs requesting HO, or differently depending on the prevailing load on (available resources of) the target gNB. In Step S415, the target gNB informs the UE of the finally accepted PDU session of slice D according to this example.

Figure 5:
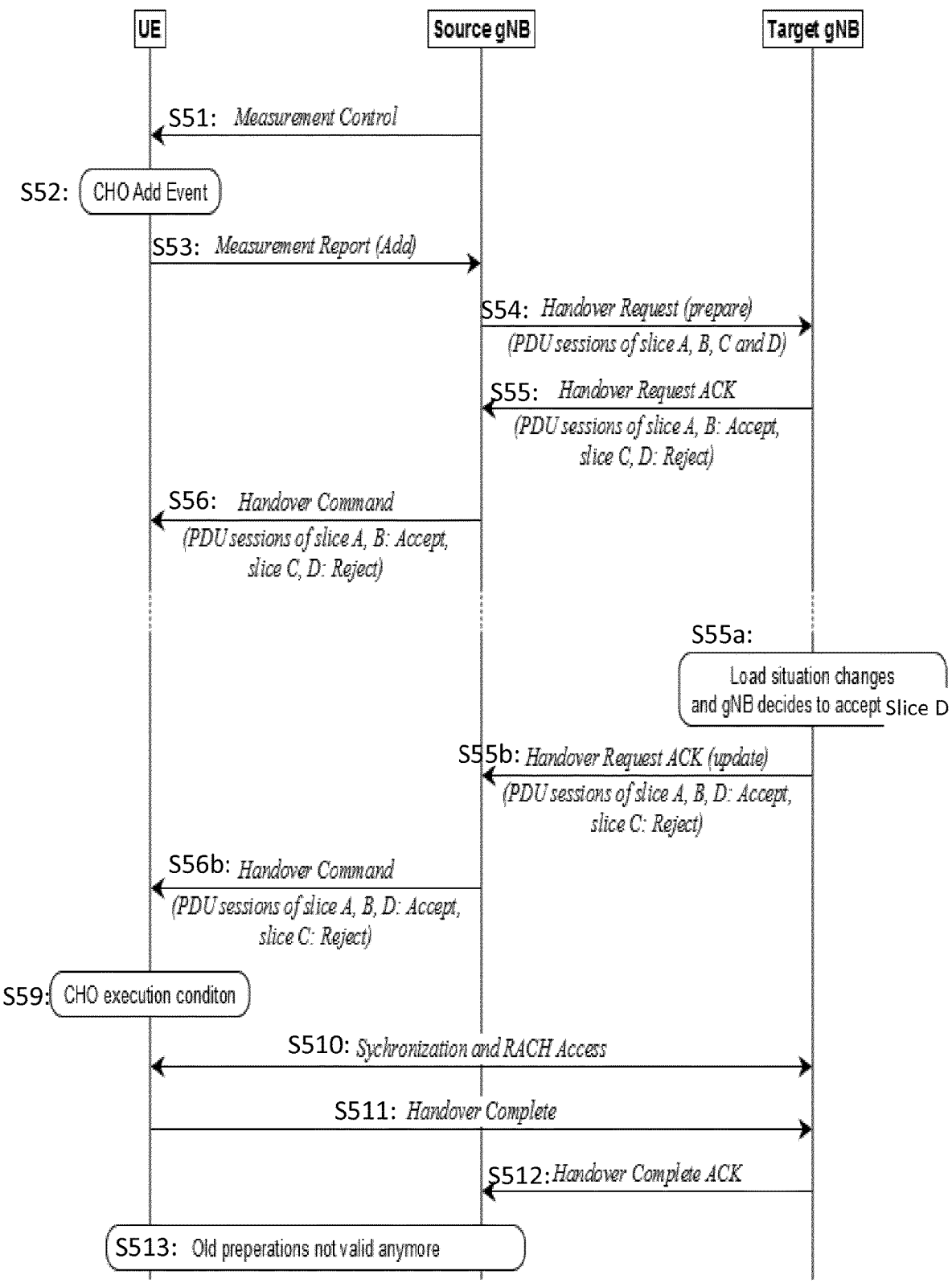
FIG. 5 shows a signaling chart of a conditional handover scenario according to a second aspect of the invention.

FIG. 5 shows an example according to a second aspect of the invention. Steps/stages S51, S52, S53, S54, S55 and S56 are substantially as steps S31 to S36 in FIG. 3. The same applies to steps S59, S510, S511, S512, S513 which largely resemble steps S39, S310, S311, S312, S313 of FIG. 3.

The difference of the modification here in this exemplar according to the second aspect resides in steps/stages S55a, S55b and S56b. Namely, an updated HO request acknowledgment is sent, S55b, from the target gNB to the source gNB and informed, S56b, to the terminal UE. The update is initiated by a step S55a in which the target gNB detects a changed load situation and decides to accept slice D (which was still rejected in step S55). (Of course, in a modification, an accepted slice may be rejected with the update in case of changed load conditions do no longer allow this.)

As show in FIG. 5, according to this second aspect the solution resides in that the target cell sends an updated HO command, if the load situation changes after the HO preparation but before the UE appears at the target cell (HO execution), i.e. before the CHO condition is met. Then, the target cell sends the updated HO command to the source cell, which then forwards it to the UE. A corresponding example of such signaling according to the second aspect is shown in FIG. 5.

Thus, stated in other words, the preliminary decision as reflected in the HO acknowledgement in S55 is validated in S55a such that a change in the predicted or current availability of the physical resources associated to the particular communication service is detected, and responsive thereto, the preliminary decision is validated by deciding based on the detected change. The validation in S55a, in this illustrated example scenario takes place before the CHO execution condition is fulfilled in S59. This means, that if the load condition at the target gNB should change after S59, this has no influence on the preliminary decision. Rather, the preliminary decision will then not be updated, but become final.

Figure 6:
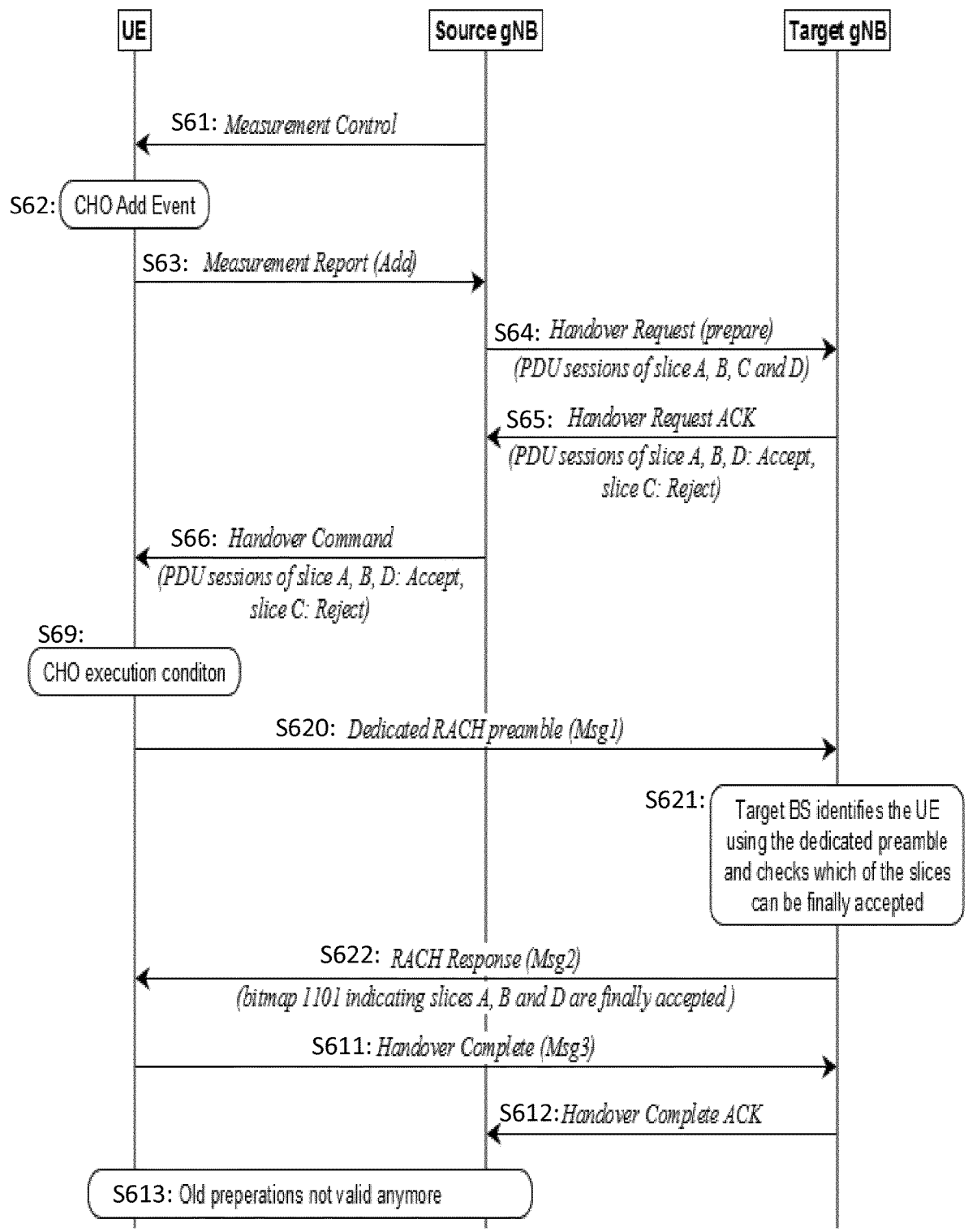
FIG. 6 shows a signaling chart of a conditional handover scenario according to a third aspect of the invention.

FIG. 6 shows an example according to a third aspect of the invention. Steps/stages S61, S62, S63, S64, S65 and S66 are substantially as steps S31 to S36 in FIG. 3. The same applies to steps S69, S611, S612, S613 which largely resemble steps S39, S311, S312, S313 of FIG. 3.

According to the example of the third aspect, a Random Access Procedure Modification for HO Execution to Target is proposed. That is, in this solution, instead of a conditional accept, the target cell just accepts/rejects the PDU sessions and prepares the HO command accordingly, see S65, S66.

During the HO execution, i.e. after CHO condition is met and CHO is executed, S69, the UE tries to establish the connection to the target cell (HO execution) and performs the Random-Access procedure. If Contention Based Random Access (CBRA) is performed, the UE may indicate to the target gNB all the accepted PDU sessions in Msg 3 (alternative not shown in FIG. 6) or, as shown, use the payload of first RACH message Msg1 in case two-step RACH is used. That is, the UE uses a dedicated RACH preamble (in Msg 1) to indicate the requested accepted/rejected slices in step S620.

The target cell, i.e. gNB, checks in S621 the up-to-date load situations during this random-access procedure and decides if any of the accepted PDU session should not be continued due to e.g. overload, or if a preliminarily rejected slice could be accepted due to e.g. reduced load and sufficient capacity.

The target cell may indicate its decision in step S622 to the UE using one of the following methods:

If Contention Free Random Access (CFRA) is performed, the target BS can use the RACH Response (RACH) (Msg2). For instance, a bitmap, where each bit corresponds to a PDU session of UE slice, can be used to indicate whether the PDU session of a slice is accepted or rejected. For instance, if the UE has four PDU sessions corresponding to four slices A, B, C and D and the target BS has decided to finally accept PDU sessions A, B and D, it can send the following bitmap to the UE 1101. This is represented in the example of FIG. 6 in S622.

If Contention Based Random Access CBRA is performed, the target BS can use either RACH Response (Msg2) or Msg4 performing the contention resolution to inform the UE about its decision. In such two-step RACH, the network can use the second RACH message, MsgB, to indicate for the UE its decision. A new RRC message (not shown in FIG. 6) after the HO execution is completed can be used irrespective of CFRA/CBRA.

Thus, as described in relation to the third aspect, the target gNB receives, S620, a request to validate the preliminary decision for a particular terminal, and responsive thereto, in S621 validates the preliminary decision by deciding based on the current availability of the physical resources. The request to validate is embedded into a uniquely identifiable radio resource management message, which is received subsequent to the preparatory handover request and to a handover-execution request triggered by a handover execution condition.

Some methods according to some example embodiments of the invention are particularly applicable to conditional handover scenarios. However, they may be applicable to other scenarios, too.

Figure 7:
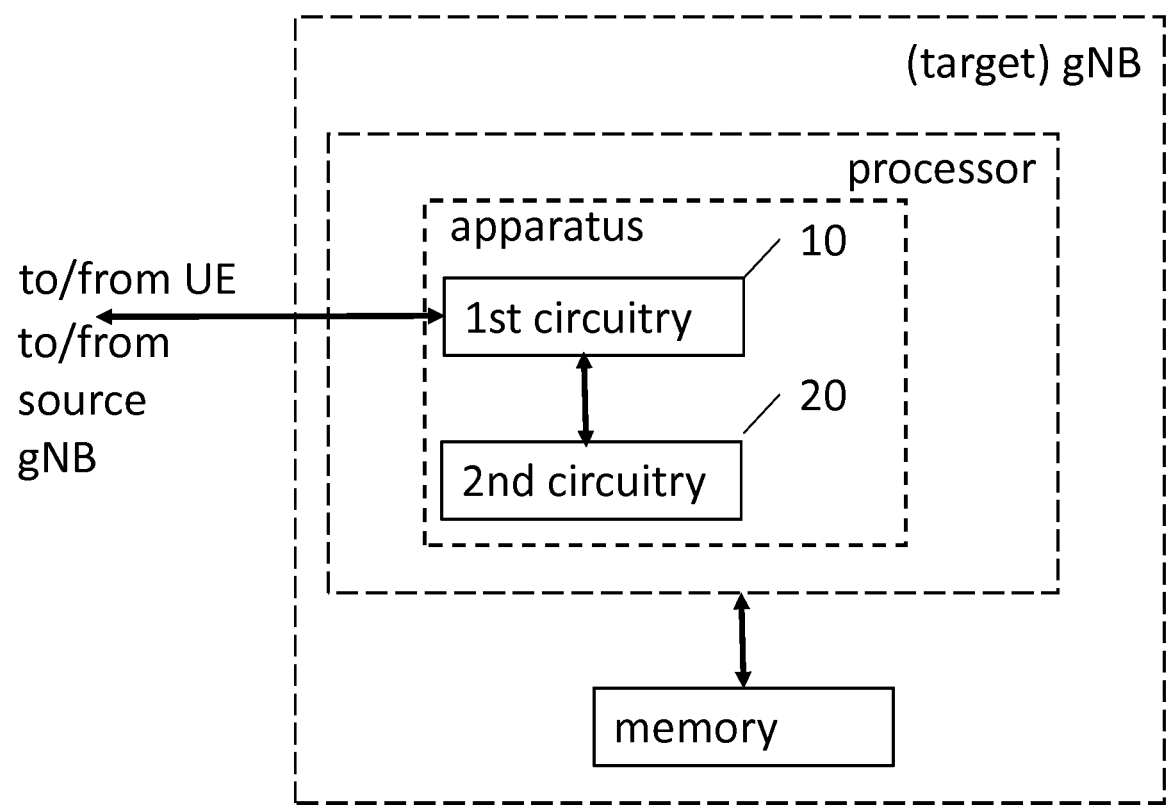
FIG. 7 shows a block circuit diagram of a target node gNB involved in several aspects of the invention.

FIG. 7 shows an apparatus (e.g. as a part of a device) according to an example embodiment of the invention. The apparatus may be a transceiver, i.e. a sender and/or receiver or an element thereof. In particular, it may be a base station, e.g. a gNB in terms of sending in downlink communication and in terms of receiving in uplink communication to/from a terminal UE.

The apparatus according to FIG. 7 may perform target gNB related aspects of the methods according to FIGS. 3 to 6 but is not limited to these methods. The methods according to FIGS. 3 to 6 may be performed by the apparatus of FIG. 7 but are not limited to being performed by this apparatus.

The apparatus comprises first circuitry 10 and second circuitry 20. The first circuitry, may be configured to receive a preparatory handover request pertaining to at least one or more physical resources, respectively associated to a particular communication service. The second circuitry may be configured to preliminarily decide on the feasibility of such preparatory handover request for each of said at least one or more physical resources associated to the particular communication service dependent on at least one feasibility criterion, and further configured to validate the preliminary decision on the feasibility of the preparatory handover request dependent on at least one validation criterion. Other possible configurations are described in relation to (target) gNB aspects as derivable from the signaling diagrams in FIGS. 3-6 and are not repeated here in detail.

The apparatus may be at least a part of a processor, to which a memory is associated. The memory is configured to store computer executable code, which, when executed by the processor or apparatus, performs the method according to any of the method aspects described herein before in relation to aspects 1 to 3 and the modifications/combinations thereof insofar as base station (target gNB) related aspects are concerned. The apparatus and/or processor may be a part of a bases station such as a gNB.

Figure 8:
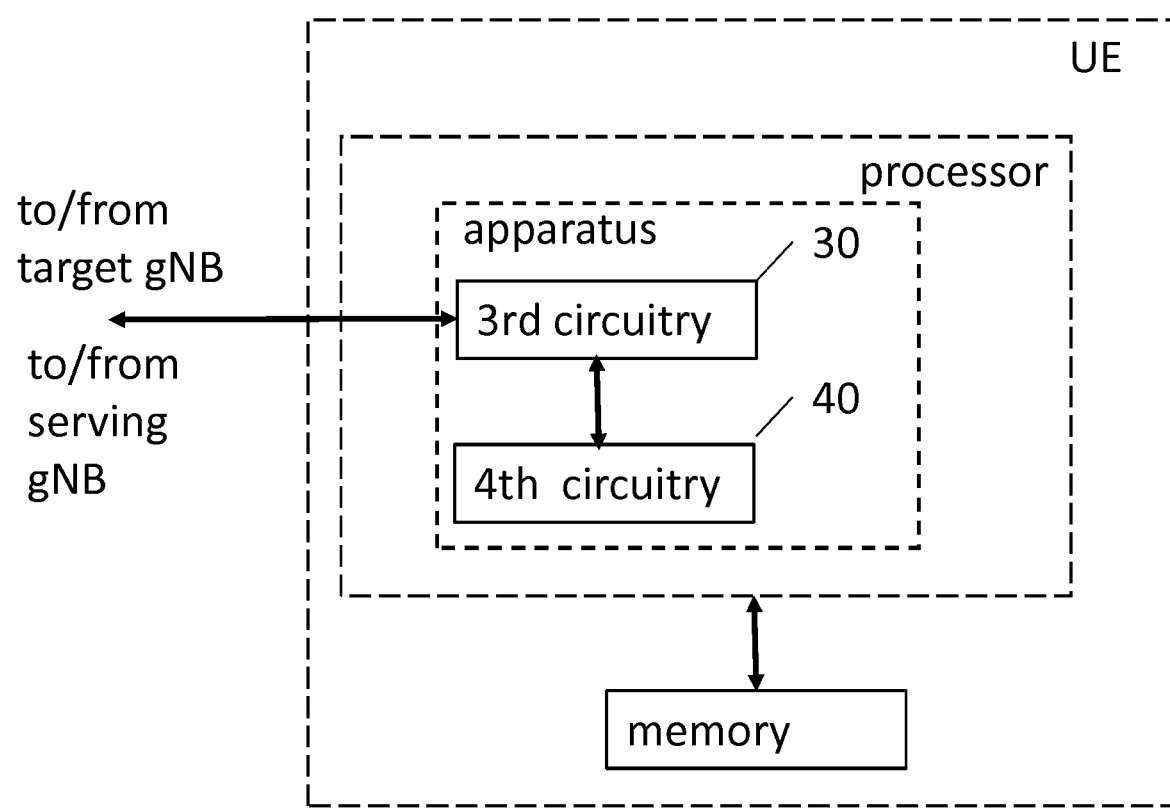
FIG. 8 shows a block circuit diagram of a terminal UE involved in several aspects of the invention.

FIG. 8 shows an apparatus (e.g. as a part of a device) according to an example embodiment of the invention. The apparatus may be a transceiver, i.e. a sender and/or receiver or an element thereof. In particular, it may be a terminal such as a user equipment UE, in terms of sending in uplink communication and in terms of receiving in downlink communication to/from a base station or gNB. As used in this context, and in relation to a handover or CHO scenario, a gNB may mean a serving gNB or source gNB as well as a target gNB (to act as a source gNB subsequent to a completed HO or CHO). Insofar as the target gNB may not directly communicate/exchange messages or signaling with the UE, it can be assumed that necessary communication or data exchange is handled via the source gNB acting insofar as a relay.

The apparatus according to FIG. 8 may perform terminal (UE) related aspects of those the methods according to the illustrations in FIGS. 3 to 6 but is not limited to these methods. The methods according to FIGS. 3 to 6 may be performed by the apparatus of FIG. 8 but are not limited to being performed by this apparatus.

The apparatus comprises third circuitry 30 and fourth circuitry 40. According to at least some aspects, the third circuitry is configured to receive at least one set of a handover configuration to be applied, and the fourth circuitry is configured to detect a handover execution condition, and responsive thereto, trigger validating the set of handover configuration. According to at least an aspect, the fourth circuitry is configured to trigger validating in that it is configured to issue a request to validate embedded into a uniquely identifiable radio resource management message, and send this request message subsequent to receipt of the at least one set of a handover configuration and subsequent detection of the handover execution condition.

According to at least an aspect, said third circuitry is configured to receive two sets of handover configurations to be conditionally applied dependent on whether a validation criterion is fulfilled or not, and the fourth circuitry is configured to apply one of those sets of handover configurations if the validation criterion is fulfilled and the other one if not.

Other possible configurations are described in relation to (target) gNB aspects as derivable from the signaling diagrams in FIGS. 3-6 and are not repeated here in detail.

The apparatus may be at least a part of a processor, to which a memory is associated. The memory is configured to store computer executable code, which, when executed by the processor or apparatus, performs the method according to any of the method aspects described herein before in relation to aspects 1 to 3 and the modifications/combinations thereof insofar as terminal or user equipment UE related aspects are concerned. The apparatus and/or processor may be a part of a terminal such as a user equipment UE.

Some example embodiments of the invention are described which are based on a 3GPP network (e.g. New Radio NR). However, the invention is not limited to NR. It may be applied to any generation (3G, 4G, 5G, etc.) of 3GPP networks.

A UE is an example of a terminal. However, the terminal (UE) may be any device capable to connect to the (3GPP) radio network such as a MTC device, an IoT device etc.

The cell may be a part of a base station and/or gNB. A base station may comprise one or more cells. A base station may be e.g. a gNB, eNB, or a NodeB. As outlined herein above, a slice and associated physical resources is identified by its slice identifier. However, the examples are not limited to a specific one of possible network slices.

The definitions indicated in the present description are based on the current 3GPP standards. However, they do not limit the invention. Other definitions according to the same or a corresponding concept are applicable to some example embodiments of the invention, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a base station such as a gNB, or a component thereof, an apparatus embodying the same, a method for controlling and/or operating the same, and computer program(s) controlling and/or operating the same as well as mediums carrying such computer program(s) and forming computer program product(s).

According to the above description, it should thus be apparent that example embodiments of the present invention provide, for example, a satellite acting as a base station (e.g. gNB or eNB), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

As disclosed herein, aspects of the invention pertain to a method, comprising receiving a preparatory handover request pertaining to at least one or more physical resources, respectively associated to a particular communication service, preliminarily deciding on the feasibility of such preparatory handover request for each of said at least one or more physical resources associated to the particular communication service dependent on at least one feasibility criterion, and validating the preliminary decision on the feasibility of the preparatory handover request dependent on at least one validation criterion. Likewise, corresponding apparatus and computer program products are addressed, both from network entity perspective such as a gNB, as well as from a terminal's perspective, e.g. from a UE perspective.

The invention claimed is:

1. A method, comprising:
receiving a preparatory handover request pertaining to at least one or more physical resources;
respectively associated to a particular communication service;
preliminarily deciding on feasibility of such preparatory handover request for said at least one or more physical resources associated to the particular communication service dependent on at least one feasibility criterion; and
validating the preliminary decision on the at least one feasibility criterion of the preparatory handover request dependent on at least one validation criterion.

2. The method according to claim 1, wherein the at least one feasibility criterion and the at least one validation criterion is based on the predicted or current availability of the physical resources associated to the particular communication service.

3. The method according to claim 2, further comprising marking each of said at least one or more physical resources associated to the particular communication service by setting an indicator indicative of the preliminary decision for the respective physical resource.

4. The method according to claim 3, further comprising:
receiving, subsequent to the preparatory handover request, a handover-execution request, triggered by a handover execution condition; and
responsive thereto, validating the preliminary decision by deciding based on the current availability of the physical resources.

5. The method according to claim 3, further comprising:
detecting a change in the predicted or current availability of the physical resources associated to the particular communication service; and
responsive thereto, validating the preliminary decision by deciding based on the detected change.

6. The method according to claim 3, further comprising:
receiving during random access a request to validate the preliminary decision for a particular terminal; and
responsive thereto, validating the preliminary decision by deciding based on the current availability of the physical resources.

7. The method according to claim 6, wherein the request to validate is embedded into a uniquely identifiable radio resource management message, which is received subsequent to the preparatory handover request and to a handover-execution request triggered by a handover execution condition.

8. The method according to claim 1, wherein the at least one validation criterion is a specified time period elapsed since the preliminary decision.

9. The method according to claim 8, further comprising creating two sets of handover configurations to be conditionally applied dependent on whether the validation criterion is fulfilled or not.

10. The method according to claim 9, further comprising:
receiving, subsequent to the preparatory handover request, a handover-execution request triggered by a handover execution condition; and
responsive thereto, validating the preliminary decision by deciding whether the handover-execution condition was triggered within the specified time period.

11. An apparatus, comprising:
a first circuitry, configured to receive a preparatory handover request pertaining to at least one or more physical resources, respectively associated to a particular communication service, and
a second circuitry, configured to
preliminarily decide on feasibility of such preparatory handover request for said at least one or more physical resources associated to the particular communication service dependent on at least one feasibility criterion, and to validate the preliminary decision on the at least one feasibility criterion of the preparatory handover request dependent on at least one validation criterion.

12. The apparatus according to claim 11, wherein the at least one feasibility criterion and the at least one validation criterion is based on the predicted or current availability of the physical resources associated to the particular communication service.

13. The apparatus according to claim 12, wherein the second circuitry is configured to mark each of said at least one or more physical resources associated to the particular communication service by setting an indicator indicative of the preliminary decision for the respective physical resource.

14. The apparatus according to claim 13, wherein:
the first circuitry is configured to receive, subsequent to the preparatory handover request, a handover-execution request triggered by a handover execution condition, and
the second circuitry is configured to, responsive thereto, validate the preliminary decision by deciding based on the current availability of the physical resources.

15. The apparatus according to claim 13, wherein the second circuitry is further configured to:
detect a change in the predicted or current availability of the physical resources associated to the particular communication service, and
responsive thereto, validate the preliminary decision by deciding based on the detected change.

16. The apparatus according to claim 13, wherein the first circuitry is further configured to:
receive during a random access a request to validate the preliminary decision for a particular terminal, and
responsive thereto, validate the preliminary decision by deciding based on the current availability of the physical resources.

17. The apparatus according to claim 16, wherein the request to validate is received embedded into a uniquely identifiable radio resource management message.

18. The apparatus according to claim 11, wherein the second circuitry is configured to start a timer to monitor, as an at least one validation criterion, a specified time period elapsed since the preliminary decision.

19. The apparatus according to claim 18, wherein the second circuitry is configured to create two sets of handover configurations to be conditionally applied dependent on whether the validation criterion is fulfilled or not.

20. A computer program embodied on a non-transitory computer-readable medium, said computer program comprising computer executable code which, when executed by a processor, causes the processor to perform the method according to claim 1.

21. An apparatus, comprising:
at least one processor; and
at least one memory including computer program code, said at least one memory and computer program code being configured, with the at least one processor, to cause the apparatus to:
receive a preparatory handover request pertaining to at least one or more physical resources respectively associated to a particular communication service;
preliminarily decide on feasibility of such preparatory handover request for said at least one or more physical resources associated to the particular communication service dependent on at least one feasibility criterion; and
validate the preliminary decision on the at least one feasibility criterion of the preparatory handover request dependent on at least one validation criterion.

* * * * *